April 24, 1928.

L. W. THOMPSON

FLOW METER AND THE LIKE

Filed Sept. 22, 1922

Inventor:
Louis W. Thompson,
by
His Attorney.

Patented Apr. 24, 1928.

1,667,612

UNITED STATES PATENT OFFICE.

LOUIS WILLARD THOMPSON, OF SCHENECTADY, NEW YORK, ASSIGNOR, BY MESNE ASSIGNMENTS, TO BAILEY METER COMPANY, A CORPORATION OF DELAWARE.

FLOW METER AND THE LIKE.

Application filed September 22, 1922. Serial No. 589,775.

The present invention relates to instruments such as flow meters and the like wherein it is desired to indicate, indicate and record or indicate, record and integrate, variations in pressure or pressure difference which pressure or pressure difference bears a definite relation to a quantity to be measured. One application of my invention is in connection with flow meters for measuring flow of fluids in conduits and such application is particularly illustrated and described herein. It will be understood, however, that the invention is not necessarily limited to this particular application.

The object of my invention is to provide an improved instrument of this character and for a consideration of what I believe to be novel and my invention, attention is directed to the accompanying description and the claims appended thereto.

Figure 1:
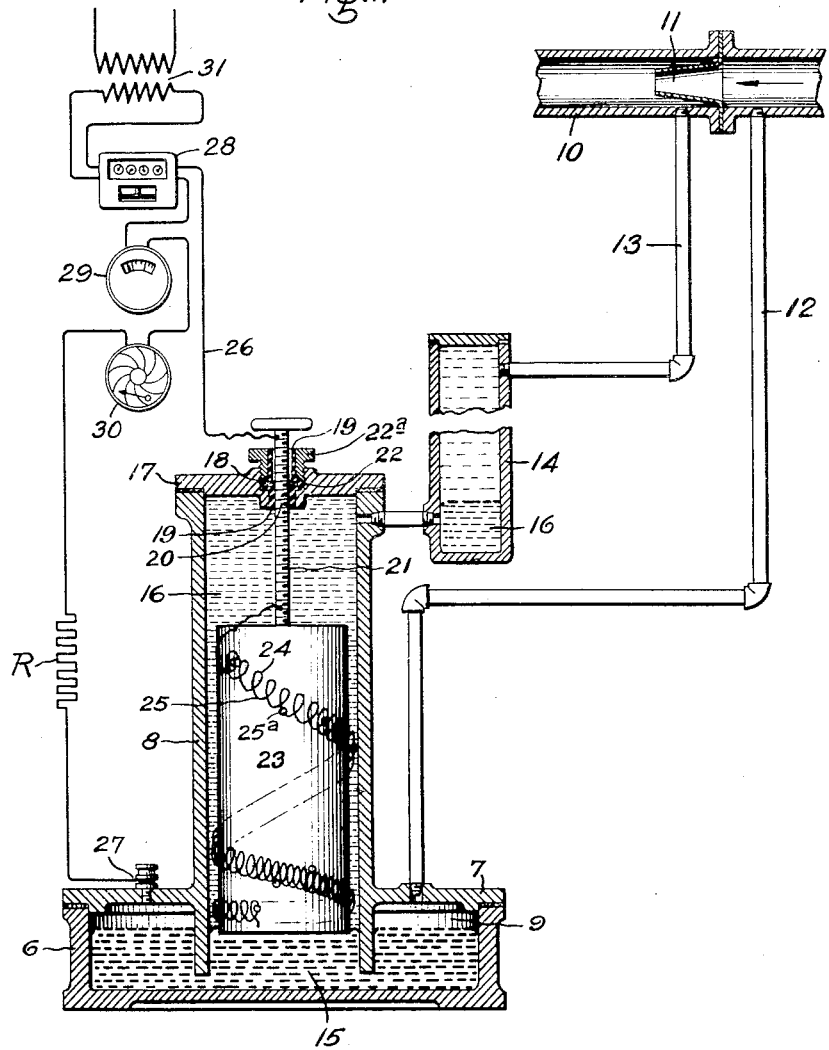
Figure 2:
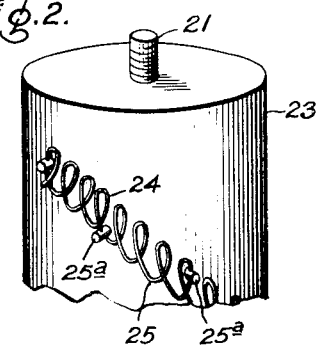
Figures 3, 4:
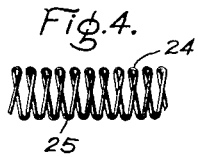

In the drawing, Fig. 1 is a diagrammatic view partly in section of a flow meter embodying my invention; Fig. 2 is an enlarged view of a resistance unit, and Figs. 3 and 4 show modified forms of resistance units.

Referring to the drawing, 6 indicates a circular casing having a cover 7 suitably fastened thereon and from the central portion of which projects a tube 8. The lower or inner end of tube 8 extends below cover 7 to a point just short of the bottom of casing 6, and this extension defines with the surrounding casing wall an annular chamber or well 9 which forms in substance the leading leg of a U-tube pressure device, the trailing leg being formed by tube 8. A conduit through which the fluid to be metered flows is shown at 10 and arranged in it is a pressure difference creating device 11 of any suitable type which creates a pressure difference which bears a definite relation to the rate of flow. The leading or high pressure side of the pressure difference creating device is connected by a conduit 12 to chamber 9 and the trailing or low pressure side is connected to tube 8 by conduit 13. In conduit 13 is a reservoir 14. In chamber 9 and tube 8 is a supply of liquid 15, such as mercury, which is a conductor of electricity. In tube 8 above the liquid 15 is a suitable non-conducting liquid 16 which does not mix with either liquid 15 or with water. When liquid 15 is mercury I have found halowax oil suitable for liquid 16.

Tube 8 is closed by a cover 17 at the center of which is a counterbored opening 18 containing a two part flanged insulating bushing 19. The lower part of bushing 19 is threaded on its inner surface and engaging with these threads are threads 20 on a metallic supporting rod 21. Between the parts of bushing 19 is a packing washer 22 for preventing leakage. The packing washer is compressed by a nipple 22ª which threads into opening 18. This forms a stuffing box for rod 21. Supported by rod 21 is a cylinder 23 of insulated material such as a phenol condensation compound hard rubber or the like. Spirally wound on cylinder 23 is a continuous looped resistance wire 24 having its upper end connected to rod 21. Resistance wire 24 may be looped in various ways. For example, it may be coiled as shown in Figs. 1 and 2, reversely bent on itself as shown in Fig. 3 or bent after the manner shown in Fig. 4. In any case the loops are kept from engagement with each other and are preferably somewhat pointed as indicated at 25, the points facing downward. The looped wire is supported on cylinder 23 with the loops in definite positions by means of pins 25ª. Connected to rod 21 is one end of an electrical circuit 26, the other end being grounded on casing 6 as indicated at 27. In circuit 26 is an integrating watt hour meter 28, an indicating ammeter 29 and a curve drawing ammeter 30, it being understood that these instruments are those which I prefer to use when my invention is embodied in a flow meter but that they are to be taken as typical of any suitable instruments it may be found desirable to use. In circuit 26 is an external resistance R and a source of constant electrical potential indicated at 31, a transformer being shown in the present instance. Either direct current or alternating current may be used.

In use, a suitable amount of liquid 15, such as mercury, is put in well 9 and cylinder 23 is adjusted until the lowermost loop of resistance wire 24 almost dips or just does dip into liquid 15. This condition represents zero flow of the fluid to be metered and equal pressures in the two legs of the instrument. Preferably the adjustment for zero is with the lowermost loop just dipping into liquid 15. When so adjusted there will be a small current flow at zero and indicating ammeter 29 and curve drawing ammeter 30 are calibrated so that with this flow they will read zero. In the case of the wattmeter 28 it may be calibrated in any suitable manner to prevent it from operating or rotating under this condition. For example, an opposing winding may be included in the current coil of the wattmeter and the current in this opposing winding adjusted by means of a rheostat in series with it until the wattmeter does not rotate under no flow or zero conditions.

If now a flow of fluid to be metered takes place in conduit 10, pressure difference creating device 11 will create a pressure difference which will be conveyed by pipes 12 and 13 to the two legs of the U-tube, the pressure in pipe 12 being the higher as is well understood. This will cause the level of liquid in well 9 to lower and that in tube 8 to rise, the difference in level being proportional to the rate of flow in conduit 10. As the liquid rises in tube 8 it will successively engage the loops of wire 24 thus cutting loop after loop out of circuit and decreasing the resistance of the current. This results in the flow of more current in the circuit, the increase in flow of current being proportional to the increase in the flow of fluid in conduit 10. Indicating ammeter 29 and curve drawing ammeter 30 may be calibrated to read in terms of flow through conduit 10 or they may be calibrated to read in terms which may be converted into terms of flow through conduit 10.

As to wattmeter 28, if flow through conduit 10 is to be integrated, it is necessary that equal increments in the height of the liquid in tube 8 produce such changes in current in the circuit that the total current flowing is proportional to the square root of the height of liquid, since the pressure difference created by the pressure difference creating device is proportional to the square of the flow. In other words, since the flow through conduit 10 varies with the square root of the pressure difference created by the pressure difference creating device or the head of liquid in tube 8, then the current in the indicating circuit must vary with the square root of the head of liquid in tube 8 in order that the current flowing may be integrated in terms of fluid flow. This means that the changes in the total resistance of the circuit i. e. the resistance of wire 26 plus the external resistance, must be such as to produce flow of current in direct proportion to the flow in conduit 11. To take care of this condition looped resistance wire 24 is coiled around cylinder 23 in a helix having a gradually increasing pitch, the arrangement being such that resistance will be removed from the circuit at such a rate that the total resistance of the circuit is inversely proportional to the square root of the liquid head. With this arrangement, flow through the electrical circuit will vary directly with the flow in conduit 10 and hence the flow through conduit 10 can be integrated by watthour meter 28. External resistance R is so chosen that the total resistance of the electrical circuit will give a suitable variation in the flow of current between zero and full scale. Full scale deflection can be tested by short circuiting wire 26.

Reservoir 14 has an area equal to the area of the annular space between cylinder 23 and casing 8 less the average area occupied by wire 24. As the liquid 15 rises in the tube 8, liquid 16 will be forced out of tube 8 and up in reservoir 14 and since this reservoir has an area equal to that of the annular space between cylinder 23 and casing 8, the head of liquid 16 on liquid 15 will always remain the same. This means that the accuracy of the instrument will not be affected by variations in head of liquid 16. It will be understood, of course, that in the case of a steam flow meter the portion of reservoir 14 above liquid 16 and pipes 12 and 13 will be maintained full of water due to condensation.

By having the resistance wire looped and then mounted spirally on a supporting member I am enabled to provide a wire having a length sufficient to give a desired amount of resistance and to have the resistance cut out of circuit loop by loop so that small variations in the level of the liquid will produce variations in resistance of a value to be readily measured and converted into terms of flow. At the same time, however, there is no continuous making and breaking of electric circuits such as will cause arcing and render the operation of the device uncertain.

The apparatus is simple in structure, accurate in operation, and well adapted in the case of a flow meter to provide substantially uniform scale instrument. Also it can be manufactured at a low cost and without the use of expensive tool equipments.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In an indicating instrument for flow meters and the like, the combination of a U-tube, a liquid therein which is a conductor of electricity, a supporting member in a leg of the U-tube, and a looped resistance wire spirally wound on said supporting member with the loops pointing downwardly and with the lower end of each successive loop located above the lower end of the preceding loop whereby when the liquid rises and falls in the leg of the U-tube it cuts such loops out of and into circuit a loop at a time.

2. In an indicating instrument for flow meters and the like, the combination of a U-tube, a liquid therein which is a conductor of electricity, a supporting member in a leg of the U-tube, and a looped resistance wire spirally wound on said supporting member with the loops flattened against said supporting member and arranged with the lower end of each successive loop located above the lower end of the preceding loop whereby when the liquid rises and falls in such leg of the U-tube it cuts the loops out of and into circuit a loop at a time.

In witness whereof, I have hereunto set my hand this 20th day of Sept. 1922.

LOUIS WILLARD THOMPSON.